US009717261B2

(12) United States Patent
Kusaura

(10) Patent No.: US 9,717,261 B2
(45) Date of Patent: Aug. 1, 2017

(54) ROASTED COFFEE BEANS

(75) Inventor: Tatsuya Kusaura, Sumida-ku (JP)

(73) Assignee: KAO CORPORATION, Chuo-ku (JP)

( * ) Notice: Subject to any disclaimer, the term of this patent is extended or adjusted under 35 U.S.C. 154(b) by 109 days.

(21) Appl. No.: 13/614,434

(22) Filed: Sep. 13, 2012

(65) Prior Publication Data

US 2013/0243930 A1 Sep. 19, 2013

Related U.S. Application Data

(63) Continuation of application No. PCT/JP2011/058012, filed on Mar. 30, 2011.

(30) Foreign Application Priority Data

Mar. 30, 2010 (JP) ................................. 2010-077831

(51) Int. Cl.
A23F 5/20 (2006.01)
A23F 5/10 (2006.01)
A23F 5/04 (2006.01)

(52) U.S. Cl.
CPC . *A23F 5/10* (2013.01); *A23F 5/04* (2013.01)

(58) Field of Classification Search
CPC ....... A23F 5/04; A23F 5/10; A23V 2250/028; A61K 31/05
See application file for complete search history.

(56) References Cited

U.S. PATENT DOCUMENTS

| 5,322,703 | A * | 6/1994 | Jensen et al. ............... 426/595 |
| 8,318,228 | B2 | 11/2012 | Shigeno et al. |
| 2007/0160726 | A1 | 7/2007 | Fujii et al. |
| 2007/0248727 | A1 | 10/2007 | Konishi et al. |
| 2009/0092736 | A1 | 4/2009 | Koyama et al. |
| 2010/0092624 | A1 | 4/2010 | Shioya et al. |
| 2010/0104702 | A1 | 4/2010 | Hayakawa et al. |
| 2010/0285182 | A1 | 11/2010 | Shioya et al. |
| 2010/0323082 | A1 | 12/2010 | Shigeno et al. |

FOREIGN PATENT DOCUMENTS

| CA | 2118627 | | 10/1994 | |
| CN | 1092946 | A | 10/1994 | |
| CN | 101014250 | A | 8/2007 | |
| CN | 101227827 | A | 7/2008 | |
| CN | 101404891 | A | 4/2009 | |
| CN | 101573043 | A | 11/2009 | |
| EP | 2 119 368 | A1 | 11/2009 | |
| JP | 2006-067942 | | 3/2006 | |
| JP | 2006-262835 | A | 10/2006 | |
| JP | 2007-289006 | | 11/2007 | |
| JP | 2008-048728 | | 3/2008 | |
| JP | WO 2008078843 | * | 7/2008 | ............... A23F 5/10 |
| JP | 2008-178399 | | 8/2008 | |
| JP | 2009-17825 | A | 1/2009 | |
| JP | 2009-153426 | | 7/2009 | |
| JP | 2011-147401 | A | 8/2011 | |
| RU | 2 354 126 | C2 | 5/2009 | |

OTHER PUBLICATIONS

Spiller, Gene S. Caffeine, CPC Press LLC, 1998, pp. 384.*
King, John, Harvey Wickes Felter and John Uri Lloyd, King's American Dispensatory, vol. 1, 1905, pp. 382 https://books.google.com/books?id=xqkMAAAAYAAJ&pg=PA382&dq=hydroquinone+and+roasting+coffee&hl=en&sa=X&ei=8HHrVNrUOLGxsATFxoGwAg&ved=0CEAQ6AEwAw#v=onepage&q=hydroquinone%20and%20roasting%20coffee&f=false.*
U.S. Appl. No. 14/020,083, filed Sep. 6, 2013, Kusaura.
International Search Report issued in PCT/JP2011/058012 on Jun. 21, 2011.
Written Opinion issued in PCT/JP2011/058012 on Jun. 21, 2011.
Office Action Issued Dec. 4, 2012, in Japanese Patent Application 2011-074661 (with English Translation).
English translation of Written Opinion issued in PCT/JP2011/058012 on Jun. 21, 2011.
Office Action issued Dec. 21, 2012, in Japanese Patent Application No. 2011-074661 with English translation.
Kazuyuki Hiramoto, et al., "Identification of hydroxyhydroquinone in coffee as a generator of reactive oxygen species that break DNA single strands", Mutation Research 419, 1998, pp. 43-51.
Atsushi Suzuki, et al., "Improvement of hypertension and vascular dysfunction by hydroxyhydroquinone-free coffee in a genetic model of hypertension", FEBS Letters 580, 2006, pp. 2317-2322.
Shizuku Coffee Thesaurus (Drop Coffee Glossary), 2009, htt://www.cafe-iko.net/04/dic-02j-ai02.htm. (with Unedited Computer-Generated English translation) 3 pages.
Japanese Official Notice issued Dec. 18, 2012 in Patent Application No. 2011-074661 with English Translation.
T. A. McDonald, et al., "Hypothesis: Phenol and Hydroquinone Derived Mainly From Diet and Gastrointestinal Flora Activity are Causal Factors in Leukemia", Leukemia (2001), pp. 10-20.
U.S. Appl. No. 13/603,946, filed Sep. 5, 2012, Shigeno, et al.
R. J. Clarke, et al., "Coffee" vol. 3: Physiology, Elsevier Applied Science Publishers LTD, 1988, pp. 1-5 and pp. 26-27.
Roland Tressl, et al., "Flüchtige Phenole in Röstkaffees verschiedener Sorten. I." (Phenols in Roasted Coffees of Different Varieties. I.) Z. Lebensm. Unters. Forsch. 167, 1978, pp. 108-110 (with English Summary).

(Continued)

*Primary Examiner* — Jill Warden
*Assistant Examiner* — Hong T Yoo
(74) *Attorney, Agent, or Firm* — Oblon, McClelland, Maier & Neustadt, L.L.P.

(57) ABSTRACT

Provided are roasted coffee beans useful for producing a coffee beverage having rich body and taste and suppressed in unpleasant taste. The roasted coffee beans of the present invention have an L value of 10 to 20, a content weight ratio [(B)/(A)] of hydroxyhydroquinone (B) to hydroquinone (A) of 3.5 or less, and a content of chlorogenic acids (C) of 0.3 to 1.5 g relative to 100 g of the roasted coffee beans.

23 Claims, No Drawings

(56) References Cited

OTHER PUBLICATIONS

Deisinger PJ, et al., "Human exposure to naturally occurring hydroquinone" 47(1):31-46, J Toxicol Environ Health, Jan. 1996, 1 Page (submitting English Abstract only).
Roland Tressl, et al., "Diphenole and Caramelkomponenten in Röstkaffees verschiedener Sorten. II." (Diphenols and Caramel Compounds in Roasted Coffees of Different Varieties. II.) Z. Lebensm. Unters. Forsch. 167, 1978 pp. 111-114 (with English Summary).

\* cited by examiner

ROASTED COFFEE BEANS

CROSS REFERENCE TO RELATED APPLICATION

This application is a continuation of PCT/JP2011/058012, filed on Mar. 30, 2011, and claims priority to Japanese Patent Application No. 2010-077831, filed on Mar. 30, 2010.

FIELD OF THE INVENTION

The present invention relates to roasted coffee beans.

BACKGROUND OF THE INVENTION

A coffee beverage, which is very popular and favorite drink, is usually produced by blending a coffee extract solution therein. Taste and flavor of a coffee beverage includes sweetness, acidity, bitterness, body, rich taste and unpleasant taste or the like. These tastes and flavors are characterized by roasted coffee beans, etc. used for producing a coffee extract solution. Furthermore, the taste and flavor of a coffee beverage vary depending upon the production country of coffee beans and the roasting method. Therefore, different types of roasted coffee beans are blended to obtain desired taste and flavor.

Furthermore, to enhance rich taste and body of a coffee extract solution, a method of adding a flavor improver to the coffee extract solution is proposed (Patent Documents 1 and 2).

PRIOR ART DOCUMENTS

Patent Document

[Patent Document 1] JP-A-2006-067942
[Patent Document 2] JP-A-2007-289006

SUMMARY OF THE INVENTION

The present invention is as described in [1] to [31] below.

[1] Roasted coffee beans having an L value of 10 to 20, a content weight ratio [(B)/(A)] of hydroxyhydroquinone (B) to hydroquinone (A) of 3.5 or less, and a content of chlorogenic acids (C) of 0.3 to 1.5 g relative to 100 g of the roasted coffee beans.

[2] The roasted coffee beans according to [1] above, wherein the weight ratio [(B)/(A)] is 3.3 or less.

[3] The roasted coffee beans according to [1] above, wherein the weight ratio [(B)/(A)] is 3.1 or less.

[4] The roasted coffee beans according to [1] above, wherein the weight ratio [(B)/(A)] is 2.9 or less.

[5] The roasted coffee beans according to any one of [1] to [4] above, wherein a content weight ratio [(A)/(C)] of the hydroquinone (A) to the chlorogenic acids (C) in the roasted coffee beans is 0.003 to 0.05.

[6] The roasted coffee beans according to any one of [1] to [4] above, wherein a content weight ratio [(A)/(C)] of the hydroquinone (A) to the chlorogenic acids (C) in the roasted coffee beans is 0.005 to 0.04.

[7] The roasted coffee beans according to any one of [1] to [4] above, wherein a content weight ratio [(A)/(C)] of the hydroquinone (A) to the chlorogenic acids (C) in the roasted coffee beans is 0.008 to 0.03.

[8] The roasted coffee beans according to any one of [1] to [4] above, wherein a content weight ratio [(A)/(C)] of the hydroquinone (A) to the chlorogenic acids (C) in the roasted coffee beans is 0.01 to 0.02.

[9] The roasted coffee beans according to any one of [1] to [8] above, wherein the L value is 10 to 19.

[10] The roasted coffee beans according to any one of [1] to [8] above, wherein the L value is 10 to 18.

[11] The roasted coffee beans according to any one of [1] to [8] above, wherein the L value is 12 to 20.

[12] The roasted coffee beans according to any one of [1] to [8] above, wherein the L value is 12 to 19.

[13] The roasted coffee beans according to any one of [1] to [8] above, wherein the L value is 12 to 18.

[14] The roasted coffee beans according to any one of [1] to [13] above, wherein the content of the chlorogenic acids (C) is 0.35 to 1.2 g relative to 100 g of the roasted coffee beans.

[15] The roasted coffee beans according to any one of [1] to [13] above, wherein the content of the chlorogenic acids (C) is 0.4 to 1 g relative to 100 g of the roasted coffee beans.

[16] The roasted coffee beans according to any one of [1] to [13] above, wherein the content of the chlorogenic acids (C) is 0.4 to 0.8 g relative to 100 g of the roasted coffee beans.

[17] The roasted coffee beans according to any one of [1] to [16] above, wherein a content of the hydroquinone (A) is 10 to 150 mg per kg of the roasted coffee beans.

[18] The roasted coffee beans according to any one of [1] to [16] above, wherein a content of the hydroquinone (A) is 15 to 150 mg per kg of the roasted coffee beans.

[19] The roasted coffee beans according to any one of [1] to [16] above, wherein a content of the hydroquinone (A) is 15 to 120 mg per kg of the roasted coffee beans.

[20] The roasted coffee beans according to any one of [1] to [16] above, wherein a content of the hydroquinone (A) is 20 to 100 mg per kg of the roasted coffee beans.

[21] The roasted coffee beans according to any one of [1] to [20] above, wherein a content of the hydroxyhydroquinone (B) is 150 mg or less per kg of the roasted coffee beans.

[22] The roasted coffee beans according to any one of [1] to [20] above, wherein a content of the hydroxyhydroquinone (B) is 10 to 150 mg per kg of the roasted coffee beans.

[23] The roasted coffee beans according to any one of [1] to [20] above, wherein a content of the hydroxyhydroquinone (B) is 10 to 130 mg per kg of the roasted coffee beans.

[24] A soluble coffee obtained by drying a coffee extract solution extracted from the roasted coffee beans according to any one of [1] to [23] above.

[25] A method for producing roasted coffee beans by subjecting starting material roasted coffee beans to a heat treatment under temperature conditions of 160 to 190° C.

[26] The method for producing roasted coffee beans according to [25] above, wherein the starting material roasted coffee beans after heat treatment have an L value of 10 to 20.

[27] The method for producing roasted coffee beans according to [25] or [26] above, wherein the L value of the starting material roasted coffee beans is equal to or more than a desired L value of the roasted coffee beans to be produced.

[28] The method for producing roasted coffee beans according to any one of [25] to [27] above, wherein time for the heat treatment is 0.1 to 10 hours.

[29] The method for producing roasted coffee beans according to any one of [25] to [28] above, wherein the heat treatment is performed under normal pressure.

[30] The method for producing roasted coffee beans according to any one of [25] to [29] above, wherein the starting material roasted coffee beans which are subjected to the heat treatment are ground roasted coffee beans.

[31] The method for producing roasted coffee beans according to [30] above, wherein the ground raw material roasted coffee beans have a size of 30 to 100-mesh.

DETAILED DESCRIPTION OF THE INVENTION

Due to diversification of consumer's preference in recent years or the like, it has been desired to develop a coffee beverage having rich body and taste and suppressed in unpleasant taste, and further having rich coffee taste and flavor with full body.

Therefore, the present invention is to provide roasted coffee beans useful as a raw material for a coffee beverage having rich body and taste and suppressed in unpleasant taste, and a method for producing the same. Also, the present invention is to provide a coffee extract solution and soluble coffee obtained from the roasted coffee beans.

The present inventors have found that roasted coffee beans, from which a coffee beverage having rich body and taste and suppressed in unpleasant taste can be provided, can be obtained by controlling the content of predetermined components included in the roasted coffee beans.

According to the present invention, there is provided roasted coffee beans useful as a raw material for a coffee beverage having rich body and taste and suppressed in unpleasant taste, and further having rich coffee taste and flavor with full body, and a method for producing the same. Accordingly, the roasted coffee beans of the present invention are useful as a raw material for a coffee extract solution, a soluble coffee and a coffee beverage.

[Roasted Coffee Beans]

The roasted coffee beans of the present invention have the L value of 10 to 20. In view of enhancing body and rich taste and suppressing unpleasant taste, the upper limit of the L value is preferably 19 and more preferably 18; whereas, the lower limit thereof is preferably 12. In the specification, the "L value" is defined as a lightness value of roasted coffee beans measured by a color difference meter, provided that the L value of black is regarded as 0 and the L value of white is regarded as 100.

In the roasted coffee beans of the present invention, the content weight ratio [(B)/(A)] of hydroxyhydroquinone (B) to hydroquinone (A) in the roasted coffee beans is 3.5 or less. In view of enhancing body and rich taste and suppressing unpleasant taste, the weight ratio is preferably 3.3 or less, more preferably 3.1 or less and even more preferably 2.9 or less; whereas, the lower limit of the weight ratio [(B)/(A)] is preferably 0.01, more preferably 0.05 and even more preferably 0.1.

Furthermore, in the roasted coffee beans of the present invention, the upper limit of a content weight ratio [(A)/(C)] of hydroquinone (A) to chlorogenic acids (C) in the roasted coffee beans is preferably 0.05, more preferably 0.04, more preferably 0.03 and even more preferably 0.02. In the meantime, the lower limit thereof is preferably 0.003, more preferably 0.005, more preferably 0.008 and even more preferably 0.01. Owing to this, not only body and rich taste but also bitterness can be enhanced while suppressing unpleasant taste, with the result that taste and flavor of coffee can be improved.

Note that, the upper limit of hydroquinone (A) content in roasted coffee beans per kg of the roasted coffee beans is, in view of enhancing body and rich taste and suppressing unpleasant taste, preferably 150 mg, more preferably 120 mg and even more preferably 100 mg; whereas, the lower limit thereof per kg of the roasted coffee beans is preferably 10 mg, more preferably 15 mg, even more preferably 20 mg.

In the roasted coffee beans of the present invention, the content weight ratio [(3)/(C)] of hydroxyhydroquinone (B) to chlorogenic acids (C) in the roasted coffee beans is, in view of the physiological effect, preferably 0.04 or less, more preferably 0.035 or less and even more preferably 0.03 or less; whereas, the lower limit thereof is preferably 0.001, more preferably 0.002, and even more preferably 0.003.

Note that, in the roasted coffee beans of the present invention, the content of hydroxyhydroquinone (B) per kg of the roasted coffee beans is preferably 150 mg or less, more preferably 10 to 150 mg, and even more preferably 10 to 130 mg, in view of the physiological effect.

In the roasted coffee beans of the present invention, the content of chlorogenic acids (C) relative to 100 g of roasted coffee beans is 0.3 to 1.5 g. In view of the physiological effect and taste and flavor, the content is preferably 0.35 to 1.2 g, more preferably 0.4 to 1 g and even more preferably 0.4 to 0.8 g.

In the specification, the "chlorogenic acids" is a general term of collectively encompassing a ($C^1$) monocaffeoylquinic acid such as 3-caffeoylquinic acid, 4-caffeoylquinic acid and 5-caffeoylquinic acid; a ($C^2$) monoferuloylquinic acid such as 3-feruloylquinic acid, 4-feruloylquinic acid and 5-feruloylquinic acid; and a ($C^3$) dicaffeoylquinic acid such as 3,4-dicaffeoylquinic acid, 3,5-dicaffeoylquinic acid and 4,5-dicaffeoylquinic acid. The content of chlorogenic acids is defined as the total amount of the above 9 types.

Furthermore, the "content of hydroquinone in roasted coffee beans", "content of hydroxyhydroquinone in roasted coffee beans" and "content of chlorogenic acids in roasted coffee beans" described in the specification are obtained based on the content of hydroquinone, content of hydroxyhydroquinone and content of chlorogenic acids in a coffee extract solution obtained from the roasted coffee beans, in accordance with the following formulae (1) to (3).

Content of hydroquinone in roasted coffee beans (mg/kg)=[the content(mg/kg) of hydroquinone in coffee extract solution]×[weight of coffee extract solution (kg)]/[weight of roasted coffee beans(kg)]    (1)

Content of hydroxyhydroquinone in roasted coffee beans(mg/kg)=[content(mg/kg) of hydroxyhydroquinone in coffee extract solution]×[weight of coffee extract solution(kg)]/[weight of roasted coffee beans(kg)]    (2)

Content of chlorogenic acids in roasted coffee beans (g/100 g)={[content of chlorogenic acids(g/g) in coffee extract solution]×[weight of coffee extract solution(g)]/[weight of roasted coffee beans(g)]}×100    (3)

Note that the analysis conditions of a coffee extract solution are as follows. First, roasted coffee beans are ground. Then, the ground roasted coffee beans which pass through a 30-mesh sieve but do not pass through a 100-mesh sieve, are collected. In the specification, the term "mesh" is specified by the "standard sieve" of JIS Z8801-1982. Next, to the ground roasted coffee beans (0.5 g), 80 g of extraction water (a solution of phosphoric acid (1 g) and 1-hydroxyethane-1,1-diphosphonic acid (HEDPO) (0.03 g) in ion-exchanged water (1 L)) was added and the extraction is performed by immersing for 10 minutes while maintaining the temperature at 95° C. or more. Subsequently, the supernatant of the coffee extract is collected and subjected to analysis described in Examples (described later) to determine contents of hydroquinone, hydroxyhydroquinone and chlorogenic acids.

Next, a method for producing the roasted coffee beans of the present invention is described.

First, starting material roasted coffee beans are prepared.

As the starting material roasted coffee beans, green coffee beans may be roasted and put in use or commercially available roasted coffee beans may be used.

The type of coffee beans is not particularly limited. Examples thereof include *Coffea Arabica, Coffea Robusta* and *Coffea Liberica* or the like. Furthermore, a production region of coffee beans include Brazil, Colombia, Tanzania, Mocha, Kilimanjaro, Mandheling, Blue Mountain and Guatemala or the like. These coffee beans may be used singly or as a blend of a plurality of types.

A method for roasting coffee beans is not particularly limited, and a known method may be appropriately selected. For example, the roasting temperature is preferably 200 to 300° C., more preferably 190 to 280° C. and even more preferably 200 to 280° C.; heating time may be appropriately set so as to obtain a desired roasting degree. Furthermore, examples of roasters which may be used include a type of roasting beans kept unmoved, a type of roasting bean while transferring and a type of roasting beans while stirring or the like. More specifically, a shelf dryer, a conveyer dryer, a rotary drum dryer and a rotary V-type dryer or the like are mentioned. Examples of a heating system include a direct heating system, a hot-air system, a half hot-air system, a far-infrared ray system, an infrared-ray system, a microwave system and a superheated steam system.

A roasting degree of the starting material roasted coffee beans is specified by an L value measured by a color difference meter. The upper limit thereof is preferably 40, more preferably 35, more preferably 30 and even more preferably 25. The lower limit thereof is preferably 10 and even more preferably 12. Note that coffee beans different in the roasting degree may be used as a mixture. Furthermore, the starting material roasted coffee beans used are roasted coffee beans having an L value which is equal to or more than a desired L value of the roasted coffee beans to be produced. Depending upon the heating temperature and time, for example, in the case where a desired L value of roasted coffee beans is 17 to 20, starting material roasted coffee beans having an L value of 25 to 40 are preferably used; and in the case where a desired L value thereof is 13 to 17, raw material roasted coffee beans having an L value of 16 to 20 are preferably used.

After the starting material roasted coffee beans are prepared, the starting material roasted coffee beans are subjected to a heat treatment under normal pressure, preferably at 160 to 190° C., more preferably at 165 to 190° C. and even more preferably at 165 to 180° C., so as to attain an L value within the aforementioned range. Owing to the treatment, body and rich taste are enhanced while suppressing unpleasant taste to improve coffee taste and flavor.

The time for the heat treatment is 0.1 to 10 hours, preferably 0.3 to 8 hours and more preferably 0.3 to 6 hours, in view of taste and flavor or the like. The "heating time" herein is specified as the lapse time after starting material roasted coffee beans are charged into a heating apparatus in the case where the heating apparatus is previously heated to a desired temperature. Alternatively, in the case where temperature is raised after starting material roasted coffee beans are charged into the heating apparatus, the heating time is specified as the lapse time after the temperature of the heating apparatus reaches to a desired temperature.

Note that the L value of the roasted coffee beans after heat treatment is as described above.

The heat treatment may be performed in air or in the presence of an inert gas such as nitrogen, and is preferably performed under normal pressure.

The heating apparatus is not particularly limited as long as it can heat raw material roasted coffee beans. For example, an electric dryer, a baking furnace, a roaster or the like may be used. Specifically, the same roasters as mentioned above may be used. As to the heating system, the same system used in the aforementioned roasters may be mentioned.

Furthermore, if a container is required for heating the starting material roasted coffee beans depending upon the heating apparatus, a desired container may be appropriately selected without any particular limitation thereto, as long as the container can be allowed to stand still in the heating apparatus and can withstand the aforementioned heating temperature. More specifically, it includes an aluminum foil, a crucible and an oven tray may be mentioned.

Furthermore, the starting material roasted coffee beans may be ground or not ground. The size of the ground starting material roasted coffee beans may be appropriately selected. For example, the roasted coffee beans ground have a size of 30 to 100 meshes, i.e., which pass through a 30-mesh sieve and do not pass through a 100-mesh sieve.

After the heat treatment, in view of taste and flavor, the coffee beans are preferably cooled to 0 to 100° C. and more preferably to 10 to 60° C. within 30 minutes. In this case, cooling may be made in air or in the presence of an inert gas such as nitrogen.

In this way, the roasted coffee beans of the present invention can be obtained.

[Coffee Extract Solution]

The coffee extract solution of the present invention is obtained from the aforementioned roasted coffee beans of the present invention. The "coffee extract solution" mentioned herein is obtained by using roasted coffee beans in an amount of 1 g or more, preferably 2.5 g or more and even more preferably 5 g or more in terms of green coffee beans relative to 100 g of the coffee extract solution.

The coffee extract solution may be obtained by directly extracting from roasted coffee beans, or drying roasted coffee beans and then extracting from the dried roasted coffee beans.

A grinding degree of the roasted coffee beans to be used for extraction may be appropriately selected. Examples thereof include extra-fine grind (0.250-0.500 mm), fine grind (0.300-0.650 mm), medium-fine grind (0.530-1.000 mm), medium grind (0.650-1.500 mm), medium-coarse grind, coarse grind (0.850-2.100 mm) and extra-coarse grind (1.000-2.500 mm). Alternatively, chopped beans having an average particle size of approximately 3 mm, 5 mm or 10 mm are exemplified.

Examples of an extraction method may include known extraction systems such as a boiling system, an espresso system, a siphon system and a drip system (paper, flannel, etc.). Furthermore, batchwise extraction, semi-batchwise extraction or continuous extraction may be employed. The extraction time of batchwise extraction or semi-batchwise extraction, in other words, contact time with roasted coffee beans or retention time of roasted coffee beans is preferably 10 seconds to 120 minutes and more preferably 30 seconds to 30 minutes, in view of taste and flavor.

Examples of an extractor may include known extractors such as paper drip, nonwoven fabric drip, a siphon, flannel drip, an espresso machine, a coffee machine, a percolator, a coffee press, ibrik, water drip, boiling, a kneader, a drip extractor and a column extractor. Furthermore, the extractor may be equipped with a jacket through which warm water, steam or cold water can be passed, or heating or cooling means such as an electric heater.

Examples of an extraction solvent include water, an aqueous solution of alcohol, milk and carbonated water or the like. Of them, in view of taste and flavor, water is preferred. The pH (at 20° C., hereinafter the same) of the extraction solvent is usually 4 to 10. In view of taste and flavor, the pH is preferably 5 to 7. Note that an extraction solvent may contain a pH regulator such as sodium hydrogencarbonate, L-ascorbic acid or sodium L-ascorbate to control pH.

The temperature of the extraction solvent may be appropriately selected depending upon the type of extraction solvent. The temperature of the extraction solvent is preferably 0 to 100° C., more preferably 10 to 100° C. and even more preferably 80 to 100° C.

The amount of extraction solvent is preferably 0.5 to 50 parts by weight relative to roasted coffee beans (1 part by weight) and more preferably 0.5 to 10 parts by weight.

The coffee extract of the present invention may have the following features i) to iii).

i) The content weight ratio [(B)/(A)] of hydroxyhydroquinone (B) to hydroquinone (A) in a coffee extract solution is 3.5 or less. In view of enhancing body and rich taste and suppressing unpleasant taste, the content weight ratio is preferably 3.3 or less, more preferably 3.1 or less and even more preferably 2.9 or less; whereas, the lower limit thereof is preferably 0.01, more preferably 0.05 and even more preferably 0.1.

ii) The upper limit of content weight ratio [(A)/(C)] of hydroquinone (A) to chlorogenic acids (C) in a coffee extract solution, in view of enhancing body and rich taste and suppressing unpleasant taste, is preferably 0.05, more preferably 0.04, more preferably 0.03 and even more preferably 0.02; whereas, the lower limit thereof is preferably 0.003, more preferably 0.005, more preferably 0.008 and even more preferably 0.01.

iii) The content weight ratio [(B)/(C)] of hydroxyhydroquinone (B) to chlorogenic acids (C) in a coffee extract solution is, in view of physiological effect, preferably 0.04 or less, more preferably 0.035 or less and even more preferably 0.03 or less; whereas, the lower limit thereof is preferably 0.001, more preferably 0.002 and even more preferably 0.003.

As described above, the coffee extract solution of the present invention contains hydroquinone (A) in an amount more than the amount usually contained therein. Because of this, body and rich taste are enhanced while suppressing unpleasant taste to improve coffee taste and flavor.

[Soluble Coffee]

In the present invention, soluble coffee may be obtained by drying the aforementioned coffee extract solution. Examples of a drying method include, but not limited to, spray drying and freeze drying or the like. Soluble coffee may take e.g., a powder-form, granular form and a tablet-form.

The soluble coffee of the present invention contains chlorogenic acids preferably in an amount of 5 to 25 wt %, more preferably 8 to 20 wt %, more preferably 10 to 18 wt % and even more preferably 12 to 16 wt %.

[Coffee Beverage]

In the present invention, a coffee beverage may be the coffee extract obtained as described above. The coffee beverage, additives such as milk components, a sweetener, a bitterness suppressant, an antioxidant, a flavor, an organic acid, an organic acid salt, an inorganic acid, an inorganic acid salt, an inorganic salt, a pigment, an emulsifier, a preservative, a seasoning, an acidulant, a vitamin, an amino acid, a pH regulator and a quality stabilizer may be added singly or in combination.

Alternatively, a coffee beverage may be produced by adding a liquid such as water, milk, carbonated water, or aqueous solution of alcohol to the soluble coffee.

The coffee beverage of the present invention contains chlorogenic acids in an amount of preferably 0.01 to 1 wt %, more preferably 0.05 to 0.5 wt % and even more preferably 0.1 to 0.3 wt %.

A coffee beverage may be provided as a packaged beverage by filling a conventional package, such as a molded container formed of polyethylene terephthalate as a main component (a so-called PET bottle), a metal can, a paper package in combination with metal foil or a plastic film, and a bottle, with the coffee beverage.

Furthermore, a packaged beverage can be produced, for example, by putting the beverage in a container such as a metal can and, when sterilized with heating is feasible, conducting heat sterilization under the sterilization conditions defined by the corresponding law (the Food Sanitation Act in Japan). In the case of a container such as a PET bottle or a paper container to which retort sterilization cannot be applied, a coffee beverage is previously sterilized for example, at a high temperature for a short time sterilization under the equivalent conditions as aforementioned above, by a plate-type heat exchanger or the like, is cooled to a predetermined temperature, and then is filling in a container. Any suitable sterilization manner may be employed.

EXAMPLES

1. Analysis of Chlorogenic Acids (CGA)

HPLC was used as an analyzer. The model numbers of component units in the analyzer are as follows:

UV-VIS detector: L-2420 (Hitachi High-Technologies Corporation),
Column oven: L-2300 (Hitachi High-Technologies Corporation),
Pump: L-2130 (Hitachi High-Technologies Corporation),
Autosampler: L-2200 (Hitachi High-Technologies Corporation),
Column: Cadenza CD-C18, 4.6 mm (inner diameter)×150 mm (length), particle size: 3 µm (Imtakt Corp.).
Analytical conditions are as follows.
Sample injection volume: 10 µL,
Flow rate: 1.0 mL/min,
Predetermined wavelength of UV-VIS detector: 325 nm,
Predetermined temperature of column oven: 35° C.,
Eluent A: 5 (v/v) % acetonitrile solution containing 0.05M acetic acid, 0.1 mM HEDPO and 10 mM sodium acetate,
Eluent B: Acetonitrile.
Concentration Gradient Conditions

| Time | Eluent A | Eluent B |
|---|---|---|
| 0.0 min. | 100% | 0% |
| 10.0 min. | 100% | 0% |
| 15.0 min. | 95% | 5% |
| 20.0 min. | 95% | 5% |
| 22.0 min. | 92% | 8% |
| 50.0 min. | 92% | 8% |
| 52.0 min. | 10% | 90% |
| 60.0 min. | 10% | 90% |

-continued

| Time | Eluent A | Eluent B |
|---|---|---|
| 60.1 min. | 100% | 0% |
| 70.0 min. | 100% | 0% |

In HPLC, a coffee extract solution was filtrated by a membrane filter (GL CHROMATODISK 25A, pore size 0.45 GL Sciences Inc.) and then subjected to analysis.

Retention time of chlorogenic acids (unit: minute) ($C^1$) monocaffeoylquinic acid: 3 peaks at 5.3, 8.8, 11.6
($C^2$) monoferuloylquinic acid: 3 peaks at 13.0, 19.9, 21.0
($C^3$) dicaffeoylquinic acid: 3 peaks at 36.6, 37.4, 44.2.

From the area values of the nine chlorogenic acids as obtained herein, the contents (g/g) of chlorogenic acids in a coffee extract solution were determined by using 5-caffeoylquinic acid used as a standard substance, and the contents (g/100 g) of chlorogenic acids in roasted coffee beans were determined in accordance with the above formula (3).

2. Method for Analyzing Hydroquinone and Hydroxyhydroquinone by HPLC-Electrochemical Detector As an analyzer, a coularray system (model 5600A, manufactured by ESA in the U.S.), that is, a HPLC-electrochemical detector (coulometric type) was used. Names and model numbers of component units of the system are as follows:

Analytical cell: Model 5010, coularray organizer,
Coularray electronics module, software: Model 5600A,
Solvent feeder module: Model 582, gradient mixer,
Autosampler: Model 542, pulse damper,
Degasser: DEGASYS ULTIMATE DU3003,
Column oven: 505,
Column: CAPCELL PAK C18 AQ, 4.6 mm (inner diameter)×250 mm (length), particle size: 5 μm (Shiseido Co., Ltd.).

Analysis conditions are follows:
Sample injection volume: 10 μL,
Flow rate: 1.0 mL/min,
Voltage application of electrochemical detector: 200 mV,
Predetermined temperature of column oven: 40° C.,
Eluent C: 5 (v/v) % methanol solution containing 0.1 (w/v) % phosphoric acid and 0.1 mM 1-hydroxyethane-1,1-diphosphonic acid,
Eluent D: 50 (v/v) % methanol solution containing 0.1 (w/v) % phosphoric acid and 0.1 mM 1-hydroxyethane-1,1-diphosphonic acid.

For preparing Eluents C and D, distilled water for high-performance liquid chromatography (Kanto Chemical Co., Ltd.), methanol for high-performance liquid chromatography (Kanto Chemical Co., Ltd.), phosphoric acid (guaranteed reagent, Wako Pure Chemical Industries, Ltd.), and 1-hydroxyethane-1,1-diphosphonic acid (60% aqueous solution, Tokyo Kasei Kogyo Co., Ltd.) were used.

Concentration Gradient Conditions

| Time | Eluent C | Eluent D |
|---|---|---|
| 0.0 min | 100% | 0% |
| 10.0 min | 100% | 0% |
| 10.1 min | 0% | 100% |
| 20.0 min | 0% | 100% |
| 20.1 min | 100% | 0% |
| 50.0 min | 100% | 0% |

A coffee extract solution was allowed to pass through BOND ELUTE SCX (packed weight of solid phase: 500 mg, reservoir capacity: 3 mL, GL Sciences, Inc.). The initial fraction (volume: approximately 0.5 mL) was discarded and other fractions were collected. Immediately upon filtrating the fractions by a membrane filter (GL CHROMATODISK 25A, pore size: 0.45 μm, GL Sciences, Inc.), the filtrate was subjected to analysis.

In the analysis by the HPLC-electrochemical detector in the aforementioned conditions, the retention time of hydroxyhydroquinone was 6.38 minutes, whereas the retention time of hydroquinone was 9.2 minutes. From the peak area values obtained, the content (mg/kg) of hydroquinone and the content (mg/kg) of hydroxyhydroquinone in the coffee extract solution were determined with reference to hydroquinone (Wako Pure Chemical Industries Ltd.) and hydroxyhydroquinone (Wako Pure Chemical Industries Ltd.) as standard substances.

In accordance with the above formulae (1) and (2), the hydroquinone content (mg/kg) and hydroxyhydroquinone content (mg/kg) in roasted coffee beans were determined.

3. Measurement of L Value

A sample was measured by a color difference meter (SPECTROPHOTOMETER SE2000 manufactured by Nippon Denshoku Industries Co., Ltd.).

4. Evaluation of Taste and Flavor

Coffee extracts solution obtained in Examples and Comparative Examples were evaluated for sweetness, acidity, bitterness, body, rich taste and unpleasant taste by 5 expert panels in accordance with the following criteria, and thereafter discussion was made to determine the final score for each taste.

1) Criteria for Evaluation of Sweetness, Acidity, Bitterness, Body and Rich Taste
   A: Strongly sensed,
   B: Sensed,
   C: Slightly sensed,
   D: Not sensed.
2) Criteria for Evaluation of Unpleasant Taste
   A: Not sensed,
   B: Slightly sensed,
   C: Sensed,
   D: Strongly sensed.

Subsequently, based on evaluation results of these items, comprehensive evaluations of coffee extract were made by 5 expert panels through discussion. Note that the comprehensive evaluation was made based on 4 criteria of A to D, where evaluation A is the most excellent and evaluation deteriorates in alphabetical order.

Example 1

Starting material roasted coffee beans having an L value of 16.5 were ground by a grinder (Wonder Blender WB-1, Osaka Chemical Co., Ltd., hereinafter the same) and sieved. The ground coffee beans, which passed through a 30-mesh sieve and not passed through a 100-mesh sieve, were charged into a dryer (DP33, Yamato Scientific Co., Ltd., hereinafter the same) previously heated to 160° C. A heat treatment was performed in the air under normal pressure at 160° C. for 0.5 hour to obtain the roasted coffee beans having an L value of 16.5 after heat treatment.

Subsequently, to the roasted coffee beans (0.5 g) after heat treatment, 80 g of water for extraction (a solution of 1 g of phosphoric acid and 0.03 g of 1-hydroxyethane-1,1-diphosphonic acid (HEDPO) in 1 L of ion-exchanged water) was added. Extraction was made for 10 minutes by immersing while maintaining the temperature at 95° C. or more. The supernatant was taken to obtain a coffee extract solution.

The obtained coffee extract solution (X) was subjected to componential analysis. The results are shown in Table 1.

Furthermore, to the roasted coffee beans (5 g) after heat treatment, 100 g of hot water (98° C. or more) was added. The mixture was sufficiently stirred, filtrated by a commercially available coffee filter to obtain a coffee extract solution. The obtained coffee extract solution (Y) was subjected to a sensory test. The results are shown in Table 1.

Example 2

Starting material roasted coffee beans having an L value of 16.5 were ground by a grinder. The ground coffee beans, which were sieved in the same manner as in Example 1, were charged into the dryer previously heated to 160° C. A heat treatment was performed in the air under normal pressure at 160° C. for 2 hours to obtain the roasted coffee beans having an L value of 13.4 after heat treatment.

The resultant roasted coffee beans after heat treatment were subjected to the componential analysis and sensory test performed in the same manner as in Example 1. The results are shown in Table 1.

Example 3

The starting material roasted coffee beans having an L value of 16.6, which remained unground, were charged into a dryer previously heated to 180° C. A heat treatment was performed in the air under normal pressure at 180° C. for 3 hours to obtain the roasted coffee beans having an L value of 15.1 after heat treatment.

The resultant roasted coffee beans after heat treatment were ground by the grinder. The ground coffee beans, which were sieved in the same manner as in Example 1, were subjected to the componential analysis and sensory test performed in the same manner as in Example 1. The results are shown in Table 1.

Example 4

The starting material roasted coffee beans having an L value of 18.3, which remained unground, were charged into a dryer previously heated to 180° C. A heat treatment was performed in the air under normal pressure at 180° C. for 3 hours to obtain the roasted coffee beans having an L value of 16.8 after heat treatment.

The resultant roasted coffee beans after heat treatment were ground by the grinder. The ground coffee beans, which were sieved in the same manner as in Example 1, were subjected to the componential analysis and sensory test performed in the same manner as in Example 1. The results are shown in Table 1.

Example 5

The starting material roasted coffee beans having an L value of 38.2, which remained unground, were charged into a dryer previously heated to 180° C. A heat treatment was performed in the air under normal pressure at 180° C. for 6 hours to obtain the roasted coffee beans having an L value of 20.2 after heat treatment.

The resultant roasted coffee beans after heat treatment were ground by the grinder. The ground coffee beans, which were sieved in the same manner as in Example 1, were subjected to the componential analysis and sensory test performed in the same manner as in Example 1. The results are shown in Table 1.

Comparative Example 1

Starting material roasted coffee beans having an L value of 16.5 were ground by a grinder. The ground coffee beans, which were sieved in the same manner as in Example 1, were subjected to the componential analysis and sensory test performed in the same manner as in Example 1. The results are shown in Table 1.

Comparative Example 2

Starting material roasted coffee beans having an L value of 18.3 were ground by a grinder. The ground coffee beans, which were sieved in the same manner as in Example 1, were subjected to the componential analysis and sensory test performed in the same manner as in Example 1. The results are shown in Table 1.

Comparative Example 3

Starting material roasted coffee beans having an L value of 22.0 were ground by a grinder. The ground coffee beans, which were sieved in the same manner as in Example 1, were subjected to the componential analysis and sensory test performed in the same manner as in Example 1. The results are shown in Table 1.

Comparative Example 4

Starting material roasted coffee beans having an L value of 24.0 were ground by a grinder. The ground coffee beans, which were sieved in the same manner as in Example 1, were charged into the dryer previously heated to 150° C. A heat treatment was performed in the air under normal pressure at 150° C. for 0.5 hour to obtain the roasted coffee beans having an L value of 22.0 after heat treatment.

The resultant roasted coffee beans after heat treatment were subjected to the componential analysis and sensory test performed in the same manner as in Example 1. The results are shown in Table 1.

TABLE 1

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Production conditions | L value of beans before heat treatment | 16.5 | 16.5 | 16.6 | 18.3 | 38.2 | 16.5 | 18.3 | 22.0 | 24.0 |
|  | Heat treatment temperature (° C.) | 160 | 160 | 180 | 180 | 180 | — | — | — | 150 |
|  | Heat treatment time (hr) | 0.5 | 2 | 3 | 3 | 6 | — | — | — | 0.5 |

TABLE 1-continued

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
|  | State of beans subjected to heat treatment (ground or not ground) | Ground | Ground | Not ground | Not ground | Not ground | — | — | — | Ground |
|  | L value of beans after heat treatment | 16.5 | 13.4 | 15.1 | 16.8 | 20.0 | — | — | — | 22.0 |
| Roasted coffee beans | Weight of hydroquinone (A) (mg/kg) | 60.7 | 76.7 | 46.6 | 28.2 | 28.4 | 63.5 | 18.0 | 21.5 | 19.8 |
|  | Weight of hydroxyhydroquinone (B) (mg/kg) | 54.8 | 15.7 | 127.5 | 95.7 | 51.5 | 231.4 | 230.0 | 182.4 | 183 |
|  | Weight of chlorogenic acids (C) (g/100 g) | 0.516 | 0.462 | 0.420 | 0.700 | 0.472 | 0.519 | 1.174 | 1.944 | 2.03 |
|  | Weight ratio(B)/(A) | 0.90 | 0.20 | 2.74 | 3.29 | 1.81 | 3.64 | 12.78 | 8.48 | 9.24 |
|  | Weight ratio(A)/(C) | 0.012 | 0.017 | 0.011 | 0.004 | 0.006 | 0.012 | 0.002 | 0.001 | 0.001 |
|  | Weight ratio(B)/(C) | 0.011 | 0.003 | 0.030 | 0.014 | 0.011 | 0.045 | 0.020 | 0.009 | 0.009 |
| Coffee extract solution | Weight ratio(B)/(A) | 0.90 | 0.20 | 2.74 | 3.29 | 1.81 | 3.64 | 12.78 | 8.48 | 9.24 |
|  | Weight ratio(A)/(C) | 0.012 | 0.017 | 0.011 | 0.004 | 0.006 | 0.012 | 0.002 | 0.001 | 0.001 |
|  | Weight ratio(B)/(C) | 0.011 | 0.003 | 0.030 | 0.014 | 0.011 | 0.045 | 0.020 | 0.009 | 0.009 |
| Taste and flavor evaluation |  |  |  |  |  |  |  |  |  |  |
| Sweetness |  | A | A | A | B | B | B | B | D | D |
| Acidity |  | A | A | A | B | A | B | B | B | B |
| Bitterness |  | A | A | A | B | A | B | B | B | B |
| Body |  | A | A | A | A | A | B | B | C | C |
| Rich taste |  | A | A | A | A | A | B | B | C | C |
| Unpleasant taste |  | A | A | A | B | A | C | C | C | C |
| Comprehensive evaluation |  | A | A | A | A | A | B | B | C | C |

From Table 1, it was demonstrated that roasted coffee beans useful for producing a coffee beverage having rich body and taste and suppressed in unpleasant taste, and further having rich coffee taste and flavor with full body can be obtained by controlling an L value and a weight ratio (B)/(A) to the specific range.

The invention claimed is:

1. A product comprising roasted coffee beans, the product having
   an L value of 10 to 20,
   a content of hydroxyhydroquinone (B) of 10 to 150 mg per kg of the roasted coffee beans,
   a content weight ratio [(B)/(A)] of hydroxyhydroquinone (B) to hydroquinone (A) of 3.5 or less,
   a content of chlorogenic acids (C) of 0.3 to 1.5 g relative to 100 g of the roasted coffee beans, and
   a content weight ratio [(B)/(C)] of the hydroxyhydroquinone (B) to the chlorogenic acids (C) of 0.001 to 0.04.

2. The product according to claim 1, wherein the weight ratio [(B)/(A)] is from 0.01 to 3.5.

3. The product according to claim 1, wherein the weight ratio [(B)/(A)] is 0.05 to 3.3.

4. The product according to claim 1, wherein a content weight ratio [(A)/(C)] of the hydroquinone (A) to the chlorogenic acids (C) in the roasted coffee beans is 0.003 to 0.05.

5. The product according to claim 1, wherein a content of the hydroquinone (A) is 10 to 150 mg per kg of the roasted coffee beans.

6. The product according to claim 1, wherein the content of the chlorogenic acids (C) is 0.35 to 1.2 g relative to 100 g of the roasted coffee beans.

7. The product according to claim 1, wherein the L value is 12 to 20.

8. The product according to claim 1, wherein the roasted coffee beans are ground roasted coffee beans.

9. The product according to claim 1, wherein the chlorogenic acids (C) is at least one of the chlorogenic acids selected from 3-caffeoylquinic acid, 4-caffeoylquinic acid, 5-caffeoylquinic acid, 3-feruloylquinic acid, 4-feruloylquinic acid and 5-feruloylquinic acid, 3,4-dicaffeoylquinic acid, 3,5-dicaffeoylquinic acid and 4,5-dicaffeoylquinic acid.

10. A soluble coffee obtained by drying a coffee extract solution extracted from the product according to claim 1.

11. The soluble coffee according to claim 10, wherein the soluble coffee contains chlorogenic acids in an amount of 5 to 25 wt %.

12. The product according to claim 1, wherein the content weight ratio [(B)/(C)] of the hydroxyhydroquinone (B) to the chlorogenic acids (C) is from 0.002 to 0.04.

13. The product according to claim 1, which is prepared by a process comprising:
   roasting coffee beans at a temperature of from 200 to 300° C., thereby obtaining starting material roasted coffee beans,
   charging the starting material roasted coffee beans to a heat treating apparatus, and
   heat treating the starting material roasted coffee beans in the heat treating apparatus at a temperature of from 160 to 190° C. under exposure to air for a time of from 0.1 to 10 hours.

14. A method for producing the product of claim 1 by subjecting starting material roasted coffee beans to a heat treatment under temperature conditions of 160 to 190° C.

15. The method according to claim 14, wherein the roasted coffee beans after heat treatment have an L value of 10 to 20.

16. The method according to claim 14, wherein the L value of the starting material roasted coffee beans is equal to or more than a desired L value of roasted coffee beans to be produced.

17. The method according to claim 14, wherein time for the heat treatment is 0.1 to 10 hours.

18. The method according to claim 14, wherein the heat treatment is performed under normal pressure.

19. The method according to claim 14, wherein the starting material roasted coffee beans which are subjected to the heat treatment are ground roasted coffee beans.

20. The method according to claim 19, wherein the ground raw material roasted coffee beans have a size of 30 to 100-mesh.

21. The product according to claim 1, which is prepared by subjecting starting material roasted coffee beans to a heat treatment under temperature conditions of 160 to 190° C.

22. The product according to claim 21, wherein time for the heat treatment is 0.1 to 10 hours.

23. The product of claim 21, wherein the heat treatment is performed under exposure to air.

\* \* \* \* \*